(12) United States Patent
Bell et al.

(10) Patent No.: US 9,916,768 B2
(45) Date of Patent: Mar. 13, 2018

(54) SYSTEMS AND METHODS FOR PROVIDING SUNLIGHT SIMULATION IN A VEHICLE SIMULATOR

(71) Applicant: THE BOEING COMPANY, Chicago, IL (US)

(72) Inventors: Charles F. Bell, Tacoma, WA (US); Gary F. Stadtmueller, Kent, WA (US)

(73) Assignee: THE BOEING COMPANY, Chicago, IL (US)

( * ) Notice: Subject to any disclaimer, the term of this patent is extended or adjusted under 35 U.S.C. 154(b) by 49 days.

(21) Appl. No.: 14/997,055

(22) Filed: Jan. 15, 2016

(65) Prior Publication Data

US 2017/0206799 A1   Jul. 20, 2017

(51) Int. Cl.
 *G03B 21/10* (2006.01)
 *H04N 9/31* (2006.01)
 *G09B 9/08* (2006.01)
 *G09B 9/32* (2006.01)

(52) U.S. Cl.
 CPC .............. *G09B 9/32* (2013.01); *H04N 9/3155* (2013.01); *H04N 9/3164* (2013.01); *G03B 21/10* (2013.01); *G09B 9/08* (2013.01); *H04N 9/3147* (2013.01)

(58) Field of Classification Search
 CPC . G03B 21/10; G09B 9/12; G09B 9/08; G09B 9/32; G09B 9/42; H04N 9/3194; H04N 9/3147

USPC ........................................................ 353/13, 29
See application file for complete search history.

(56) References Cited

U.S. PATENT DOCUMENTS

| | | | | |
|---|---|---|---|---|
| 6,042,238 | A | * | 3/2000 | Blackham .............. G03B 37/04 353/30 |
| 8,967,838 | B1 | * | 3/2015 | Miller ..................... F21K 9/233 362/239 |
| 2003/0194683 | A1 | | 10/2003 | Vorst |
| 2010/0033979 | A1 | * | 2/2010 | Duranti ................... F21S 8/006 362/471 |
| 2010/0103131 | A1 | * | 4/2010 | Segal ....................... G07F 9/02 345/173 |
| 2012/0156653 | A1 | | 6/2012 | Wokurka |
| 2013/0120362 | A1 | * | 5/2013 | Harris ............... H04N 13/0459 345/419 |
| 2013/0280678 | A1 | | 10/2013 | Towers et al. |

* cited by examiner

*Primary Examiner* — Ryan Howard
(74) *Attorney, Agent, or Firm* — Toler Law Group, PC

(57) ABSTRACT

Systems and methods for providing sunlight simulation in a vehicle simulator include a vehicle simulator. The vehicle simulator includes a visual projector configured to generate visual scene images and a bright forward field of view projector mounted with the visual projector, wherein the bright forward field of view projector includes plural light emitting diode (LED) light sources configured to generate a bright forward field of view. The vehicle simulator also includes a projection screen configured to project the visual scene images generated by the visual projector or the bright forward field of view generated by the bright forward field of view projector.

20 Claims, 6 Drawing Sheets

SYSTEMS AND METHODS FOR PROVIDING SUNLIGHT SIMULATION IN A VEHICLE SIMULATOR

BACKGROUND

The present disclosure relates in general to vehicle simulators, especially flight simulators.

Testing may be performed for a particular aircraft. For example, sunlight testing may be performed in an engineering environment, such as with a Boeing Commercial Aircraft (BCA) engineering simulator that uses real airplane cockpit structures along with real avionics for development and testing purposes. In some situations, a training simulator may be used if the avionics systems are real airplane hardware. Thus, different testing and evaluations, such as testing or evaluation of the flight deck controls, may be performed.

Some simulators, including engineering simulators for aircraft, are equipped with systems for simulating ambient solar lighting that allows for evaluations of flight deck surfaces, windows, controls and displays under different lighting conditions expected during service (e.g., while in flight). The evaluations allow pilots and engineers to identify potential certification and customer acceptance concerns before formal engineering flight testing for pilot optical performance.

The most difficult condition to simulate is a bright forward field of view that simulates the sun above the forward horizon and above a cloud deck. Some conventional systems use a large array of high pressure discharge lamps aligned to a cockpit sized reflector to generate the appropriate bright forward field of view condition. High pressure discharge lamps produce a significant amount of ultraviolet and infrared radiation. The lamp array requires significant power and produces a significant amount of heat. Moreover, the mechanical structures and reflector that are used are installed temporarily for lighting tests and often require many hours for each lighting test setup and tear down.

Thus, in conventional simulator visual systems, such as wide field of view simulator visual systems, providing a bright forward field of view simulation can be costly in both setup and tear down that requires extensive time and effort, while also requiring significant power for operation.

SUMMARY

In one embodiment, a vehicle simulator is provided that includes a visual projector configured to generate visual scene images and a bright forward field of view projector mounted with the visual projector, wherein the bright forward field of view projector includes plural light emitting diode (LED) light sources configured to generate a bright forward field of view. The vehicle simulator also includes a projection screen configured to project the visual scene images generated by the visual projector or the bright forward field of view generated by the bright forward field of view projector.

In another embodiment, a vehicle simulator system is provided that includes a cabin configured to receive therein a person, wherein the cabin includes at least one window. The vehicle simulator system also includes a flight simulator visual display system configured to project a visual image or a bright forward field of view generated by a simulator that is viewable by the person through the at least one window of the cabin, the bright forward field of view generated using light emitting diode (LED) light.

In another embodiment, a method for generating simulation images for a simulator is provided. The method includes mounting a bright forward field of view projector with a visual projector and generating images using the visual projector, wherein the bright forward field of view projector generates simulated ambient solar lighting using a light emitting diode (LED) light source. The method also includes displaying the images for viewing.

DETAILED DESCRIPTION

Figure 1:
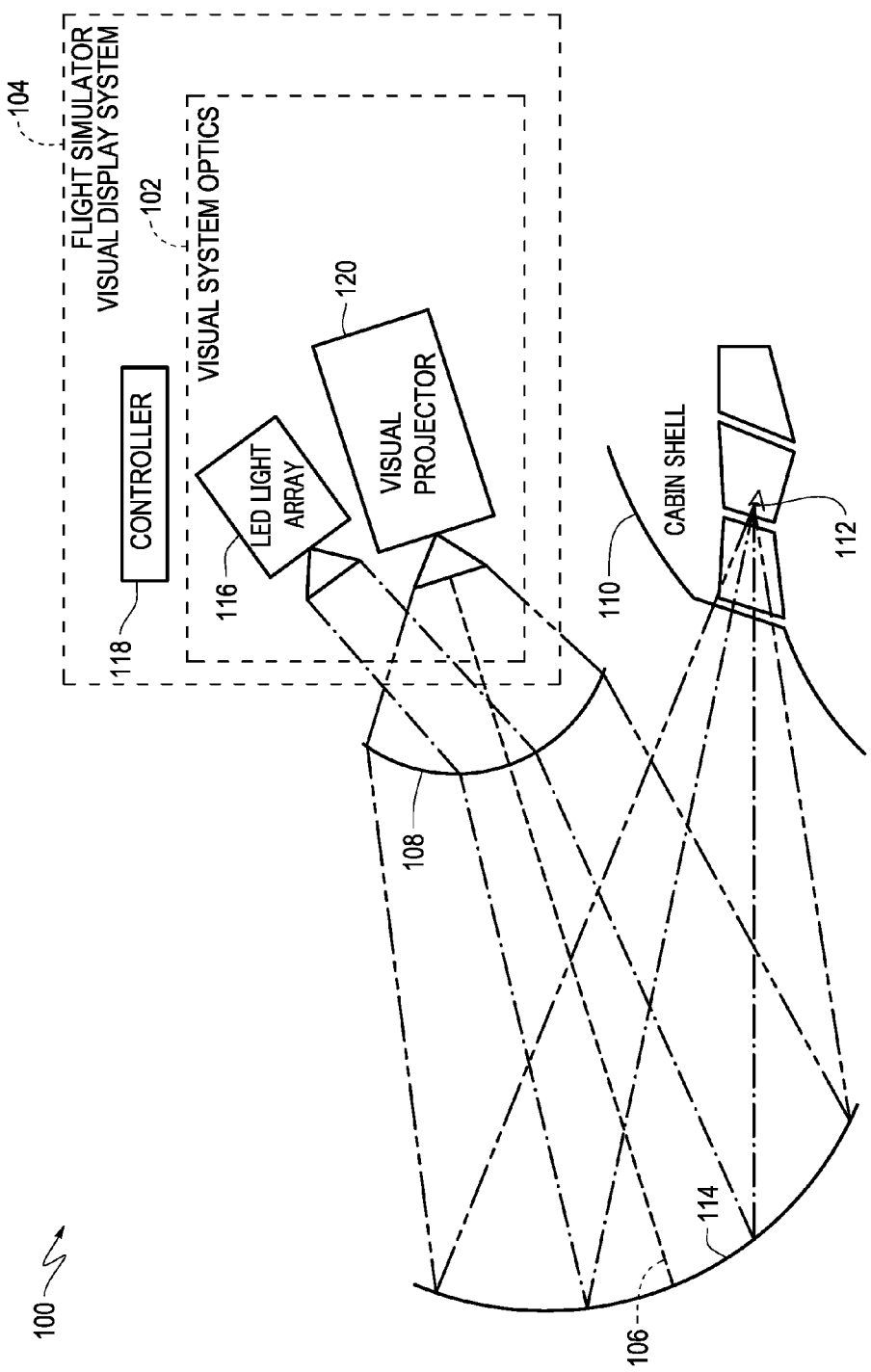
FIG. 1 is a diagram illustrating a vehicle simulator system in accordance with an embodiment.

The following detailed description of certain embodiments will be better understood when read in conjunction with the appended drawings. To the extent that the figures illustrate diagrams of the functional blocks of various embodiments, the functional blocks are not necessarily indicative of the division between hardware circuitry, between software elements or between hardware and software implementations. Thus, for example, one or more of the functional blocks may be implemented in a single piece of hardware or multiple pieces of hardware. Similarly, the software programs may be stand-alone programs, may be incorporated as subroutines in an operating system, and the like. It should be understood that the various embodiments are not limited to the arrangements and instrumentality shown in the drawings.

As used herein, the terms "system," "subsystem", "unit," or "module" may include any combination of hardware and/or software system that operates to perform one or more functions. For example, a system, unit, or module may include a computer processor, controller, or other logic-based device that performs operations based on instructions stored on a tangible and non-transitory computer readable storage medium, such as a computer memory. Alternatively, a system, subsystem, unit, or module may include a hard-wired device that performs operations based on hard-wired logic of the device. The systems, subsystems, modules, or units shown in the attached figures may represent the hardware that operates based on software or hardwired instructions, the software that directs hardware to perform the operations, or a combination thereof.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments provide systems and methods for providing bright forward field of view simulation (e.g., sunlight simulation) in a vehicle simulator, such as a flight simulator. In some embodiments, the bright forward field of view simulation system can be integrated into vehicle simulators equipped with wide angle collimated out-the-window visual systems that reduces the setup and tear down time, requires less power than conventional systems, and generates much less heat than conventional systems. In some embodiments, the bright forward field of view simulation generates luminance of 10,000+ foot Lamberts (fL) at the pilot's eye point collimated to greater than 80 feet. However, different levels of luminance may be generated in accordance with various embodiments. For example, in some embodiments, the bright forward field of view simulation generates luminance in accordance with Federal Aviation Administration (FAA) Advisory Circular (AC) 25-11B—Electronic Flight Displays. Thus, in some embodiments, the bright forward field of view simulation may generate luminance at different desired or required levels.

By practicing one or more embodiments, sunlight simulation in engineering flight deck simulators allows for the evaluation of flight deck controls and displays under conditions expected in service. For example, the evaluations allow for the identification of risks to certification before a formal flight testing. One or more embodiments may be integrated into a visual display system of a flight simulator, thereby eliminating the need for hazardous light sources, complex structures and large reflecting surfaces. Additionally, setup and tear down labor will be reduced, as such labor is not repeatedly needed with the integrated bright forward field of view simulation system.

In various embodiments, light emitting diode (LED) based lights, such as LED based studio lighting is used for flight simulator sunlight simulation. The use of LED light sources does not produce significant amounts of ultraviolet or infrared radiation, requires a reduced power level (e.g., requires one third the power of conventional systems) and generates less heat. By integrating the bright forward field of view simulation system with LED lighting into the flight simulator visual display system, the need for temporary structures and large reflectors is eliminated. For example, as described herein, one or more embodiments for generating bright forward field of view simulation may be integrated into the visual system (such as the simulator optics) of the simulator such that a large screen arrangement (e.g., tall cylindrical screen and/or large spherical reflector) is not needed and the optics are not damaged by the generated light. As described herein, one or more embodiments use LED arrays permanently coupled with (e.g., mounted to or within) the visual system of the simulator in combination with a back projection screen and mirror.

As illustrated in FIG. 1, a vehicle simulator system 100 (also referred to as a vehicle simulator 100) may be configured as an aircraft simulator. The vehicle simulator 100 includes visual system optics 102 provided as part of a flight simulator visual display system 104, which in the illustrated embodiment is aligned on a projector centerline 106. The flight simulator visual display system 104 projects a simulator image (e.g., an out-the-window scene image) to a projection screen 108. In various embodiments, the projection screen is a back projection screen.

A cabin shell 110 is provided, which was may be an actual portion or replica of an aircraft. As can be seen in FIG. 1, a pilot eye point 112 (which may be defined by a reference point for a view from each simulator seat) is directed towards the images projected by the visual system optics 102. As discussed below, the images may be projected to the projection screen 108 (configured as a spherical rear projection screen) and then to a spherical collimating mirror, such as a spherical first surface collimating mirror 114, which the individual in the cabin shell 110 sees.

More particularly, in operation, the vehicle simulator 100 (configured in some embodiments as a BCA engineering simulator or as a flight simulator system) may be provided for visual (scene/out window) simulation and sunlight simulation (e.g., a bright forward field of view) without the use of high pressure discharge lamps and without the use of temporary mounting structures or large reflectors. It should be appreciated that in operation, when the bright forward field of view is enabled (by activating the LED light array 116), the image produced by the visual system projector(s), such as the visual projector 120, will not be viewable (e.g., the bright forward field of view will washout the image). For example, in some embodiments, the visual system (including the visual projector 120) produces a nominal light level of 10 fL to the eye reference points (ERP's). The bright forward field of view in these embodiments is three orders of magnitude brighter. Crew accommodation and low contrast due to light scatter in the system will make the visual image undetectable.

Figure 2:
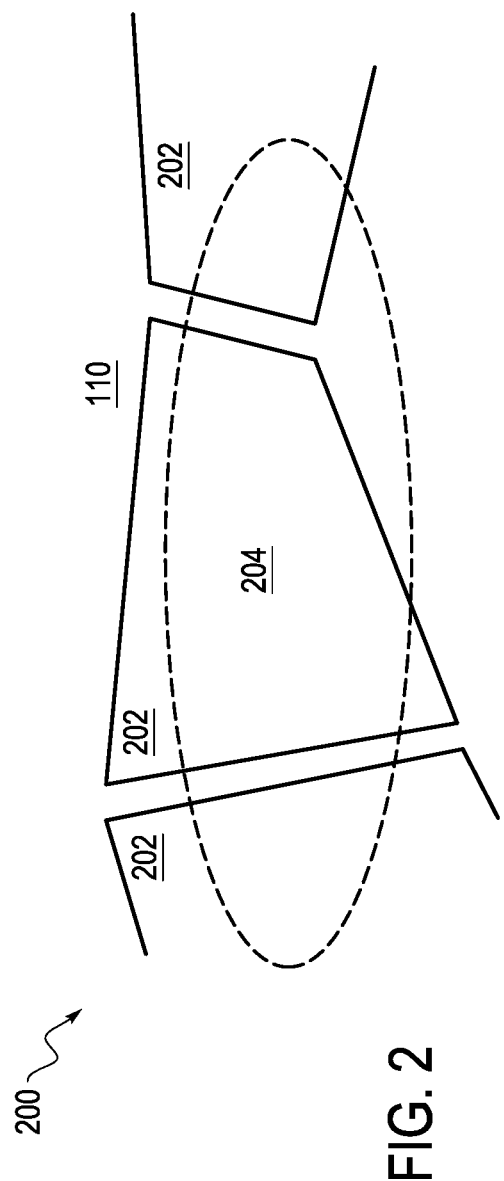
FIG. 2 is a diagram illustrating a portion of a cabin shell of a simulator in accordance with an embodiment.

As can be seen in FIG. 1, in the illustrated embodiment, the images are projected from the visual projector 120, to the back projection screen 108, and then to the spherical first surface collimating mirror 114 to provide realistic simulated images from the pilot's eye point 112. For example, as shown in FIG. 2, within the cabin shell 110 is a window structure 200 that includes a plurality of windows (e.g., aircraft cockpit windows 202). The vehicle simulator system 100 generates images. The vehicle simulator also generates a bright forward field of view 204, which is illustrated as positioned in front of a left pilot's eye point, such that a pilot (or other user, such as an engineer) views a scene/out window image or the bright forward field of view 204.

In the illustrated embodiments, an LED light array 116 (also referred to as an LED light source), is provided in combination with the flight simulator visual display system 104, such as mounted with the visual system optics 102. For example, in some embodiments, the LED light array 116 is an LED based studio type lamp array configured to generate the bright forward field of view 204 using LED light (e.g., bright light simulating ambient solar light). In one embodiment, the LED light array 116 is capable of generating a luminance of 10,000+ foot Lamberts (fL) at the pilot's eye point 112 collimated to greater than 80 feet such that the virtual image from such an arrangement appears to come from an effectively infinite distance, thereby precisely simulating out-the-window scenes.

Referring again to FIG. 1, in one embodiment, the vehicle simulator 100 includes a computer based control to generate the images. In some embodiments, a controller 118 may be provided in connection with the LED light array 116 to control the output from the LED array 116 to generate the bright forward field of view 204. For example, the controller 118 may be configured to provide communication of control signals to the LED array 116. In one embodiment, the controller 118 includes a digital multiplex (DMX) bus that operates to control the focus and intensity of the bright forward field of view 204 generated by the LED array 116. For example, the DMX bus may be a DMX512 bus operable to provide a digital communication network that is used to control studio or stage lighting and effects. Thus, the LED array 116 provides an integrated sunlight simulation capability with the light simulator visual display system 104. For example, various embodiments provide for integration of the bright forward field of view 204 simulation (with the LED array 116) into cross-cockpit collimated visual systems (such that pilots seated side by side in the simulator effectively see the same image). In various embodiments, the bright forward field of view 204 may be configured and controlled remotely via the DMX bus.

By practicing one or more embodiments, the visual system collimation optics (illustrated as the visual system optics 102 in FIG. 1) is used in combination with the LED array 116 (fixedly coupled to the system) to generate the bright forward field of view 204 and visual images generated by a visual projector 120, which in various embodiments is a visual scene projector that projects simulated out-of-window images viewable by an individual within the cabin shell 110. Thus, in various embodiments, the LED array 116 operates as a projector of the bright forward field of view 204 that provides sunlight simulation. As such, in various embodiments, simulated sunlight capabilities are integrated into the vehicle simulator 100 without the use of high pressure discharge lamps. Thus, in various embodiments, an LED type lighting arrangement replaces an array of high pressure discharge lamps, such that the LED type lighting arrangement provides sunlight simulation.

The vehicle simulator 100 may be used in conjunction with a flight simulation system used, for example, to train aircrew to fly and operate an aircraft or configure or test one or more systems of an aircraft. The flight simulation system typically includes a simulation pilot or engineer facing the projection screen 108 who may move his head during the simulation system within a viewing volume or line of view. Thus, for example, a user is able to view an "out-the-window" scenario simulating the outdoor environment that might be typically seen by the pilot flying an actual aircraft in combination with a simulated sun above the forward horizon and above the cloud deck. It should be noted that the computer-generated scenario may include the terrain, landscape, cultural features such as, buildings, vehicles, and other simulated aircraft flying in the vicinity of the pilot's simulated position as part of the visual image generated by the visual projector 120.

Within the cabin shell 110, the pilot or engineer may also be provided with a conventional or simulated cockpit including an array of cockpit components, such as a throttle, flight stick and associated controls and indicators, a number of head-down cockpit displays displaying various navigation, and/or situational information. The pilot or engineer may be positioned in a predefined viewing volume facing the projector screen 108.

Figure 3:
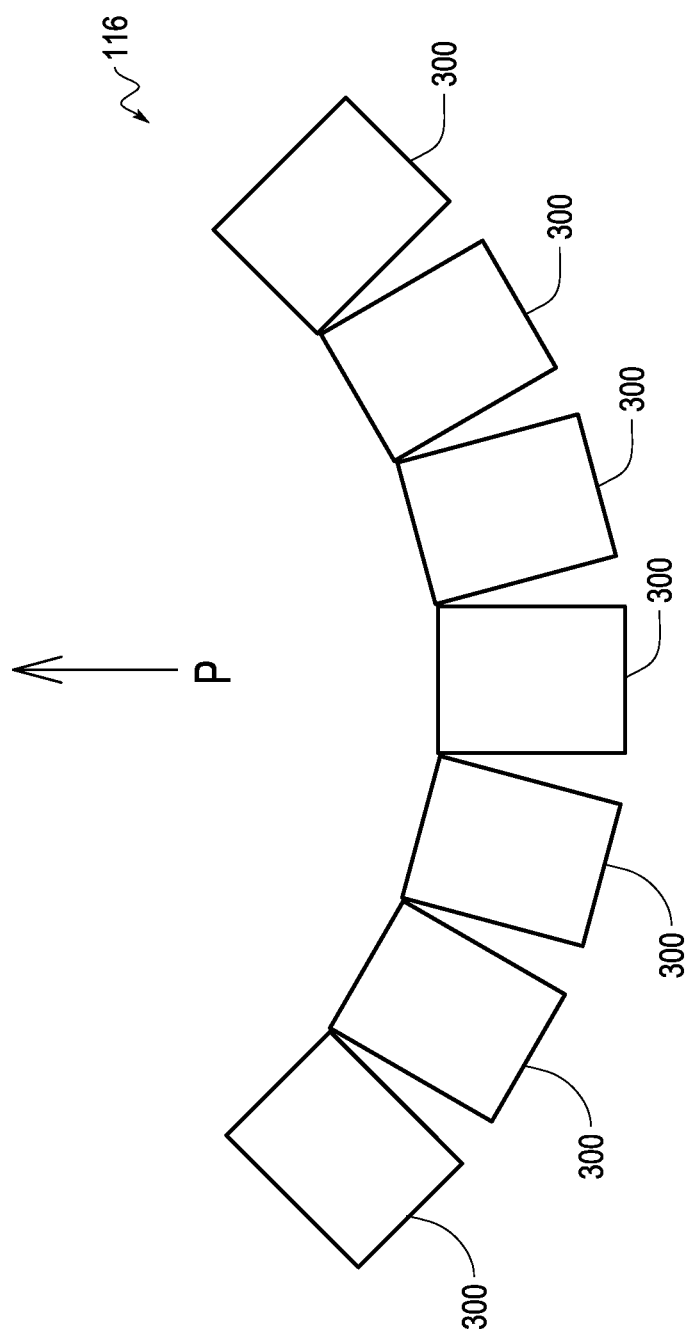
FIG. 3 is a diagram illustrating a light generation system in accordance with an embodiment.

One embodiment of the LED array 116 will now be described in connection with FIG. 3 (with additional reference to FIGS. 1 and 2). It should be noted that like numerals represent like components in the various figures. In the illustrated embodiment, the LED array 116 includes plural LED light sources 300, which in some embodiments are sub-panels of LEDs. In the illustrated embodiment, the LED light sources 300 are arranged in an adjacent relationship and aligned along an arcuate path facing inward toward a direction of projection (illustrated by the arrow P). In one embodiment, the LED light sources 300 position radius of curvature is 150 centimeters (cm) with each of the LED light sources 300 having a light source generation width of about 39 cm. However, as should be appreciated, a different radius of curvature may be provided as desired or needed, such as based on the configuration of the projection screen 108, which may need to be modified. For example, the back projection screen cap may need to be modified to accommodate the LED light sources 300.

The arrangement of the LED light sources 300 defines a sunlight simulation forward field of view configuration to generate the bright forward field of view 204. As should be appreciated, the LED light sources 300 require much less power, generate much less heat and pose a reduced risk to individuals, particularly during installation (e.g., reduce chance of sunburned mechanic) compared to conventional simulator systems that generate sunlight simulations of similar bright light conditions. Additionally, when using the LED light sources 300, a UV inhibitor is not needed to reduce the potential danger of the UV exposure when using high pressure discharge lamps.

In various embodiments, the LED light sources 300 are mounted above a conventional or existing projector enclosure, which in some embodiments houses the visual projector 120. In one embodiment, each of the LED light sources 300 (also referred to as LED lamps) provides approximately 1900 fL at the ERP and are aligned to a visual display system design reference point (0°,0°). As such, in this embodiment, the combined total luminance measured from the ERP's is 10,000 fL to 14,000 fL within a 1° radius around the visual display system design reference (with all LED light sources 300 in a spot mode). In one embodiment, each of the LED light sources 300 draws 350 watts maximum for a total bright forward field array drawing 2,450 watts. In this embodiment, two twenty amp single phase power connections are used to connect the LED light sources 300 to the system. It should be noted that the ERP in various embodiment refers to the eye reference point for a particular crew station (e.g., pilot), which is usually expressed in airplane coordinates (buttocks line, station line and water line).

It should be appreciated that the number of LED light sources 300 (seven LED light sources are shown) and the operating characteristic of each may be modified as desired or needed, for example, based on the simulator requirements. In one embodiment, the LED light sources 300 are light panels, such as daylight color temperature LED Fresnel fixtures (also referred to as daylight LED Fresnel fixtures). However, different types of LED light lamps or sources may be used. When using the light panels, such as the LED Fresnel fixtures, the controller 118 may be a DMX controller that couples with the light panels to control the lamp intensity and flood/spot focus, which may be controlled remotely. Thus, various different types of light sources may be used as the LED light sources 300, which may be controlled using different control arrangements.

Figure 4:
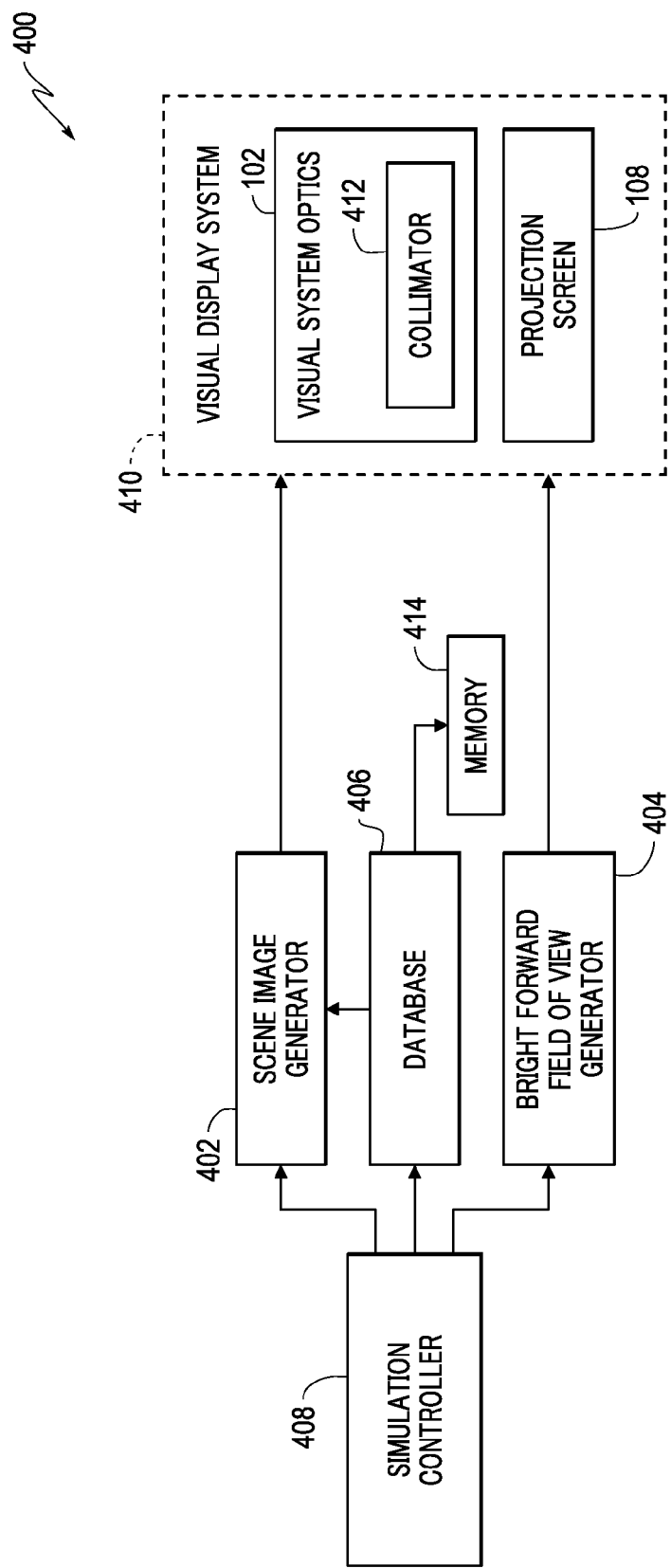
FIG. 4 is a block diagram of an image generation system in accordance with an embodiment.

An image generation system 400 of the flight simulator 100 will now be described in connection with FIG. 4 (with additional reference to FIGS. 1-3). The image generation system 400 includes a scene image generator 402, a bright forward field of view generator 404, a database 406, a display system controller, illustrated as a simulation controller 408 and a visual display system 410. It should be noted that the visual display system 410 may be embodied as the flight simulator visual display system 104 that includes the visual system optics 102 (both shown in FIG. 1) that has a collimator 412 for collimating scene images and the bright forward field of view 204 for display on the projection screen 108.

The visual display system 410 is coupled to the scene image generator 402. The scene image generator 402 receives data from the database 406. The data may be processed based on the simulated position of the operator's aircraft, and a video image representative of a portion of the display image can be generated and presented to the pilot from viewing from the cabin shell 110. As should be appreciated, the scene image generator 402 and the bright forward field of view generator 404 generate, respectively, scene images and bright forward field of views for display on the projection screen 108 (e.g., projected by the LED array 116 and the visual projector 120). However, as described herein, when the bright forward field of view is enabled, the bright light of the bright forward field of view will washout the image from the scene image generator 402.

In various embodiments, the database 406 includes a multi-dimensional structural database that may be used by the scene image generator 402 to create images that will be displayed on the projection screen 108. In one embodiment, the contents of the database 406 are downloaded during initiation of a simulation session across a communication link into a memory 414 (which may form part of one or more of the components shown in FIG. 1). In another embodiment, a copy of the data in the database 406 may be provided and maintained in a central computer system (not shown) that may be accessible by the scene image generator 402. In yet another embodiment, the data in the database 406 (or portions thereof) may be updated during the simulation session from the central computer system.

The image generation system 400 includes the simulation controller 408 that provides overall control of the flight simulation. The simulation controller 408, for example, allocates where the scene image will be displayed, such as by providing a viewing location defining an address into the database 406 storing the data and information necessary for the image generator 402 to generate, and projection screen 108 to display, the images. Communication between the various components illustrated in FIG. 4 may be provided via a wide band communication link, such as, for example, an Ethernet type communication bus or, in some embodiments, via a wireless communication link.

In one embodiment, the collimator 412 includes a collimating mirror, such as the spherical first surface collimating mirror 114. The collimator 412 can create a virtual image when a projection screen projects images thereon. The projection screen 108 may be positioned at an effective focal distance of the collimator 412 such that the virtual image from such an arrangement appears to come from an effectively infinite distance, thereby precisely simulating out-the-window scenes.

The scene image generator 402 may enlarge the video image thereby permitting the operator to view the images with a degree of head motion. In some embodiments, the image source may be made larger than that required for viewing on the optical axis to allow some lateral (right/left or up/down) motion without seeing the edge of the image surface when viewed through or off the collimator 412.

In some embodiments, the collimator 412 is mounted parallel to the surface of the projection screen 108 with the optical axis pointed toward the simulation pilot. Thus, some of the images generated and displayed may be displayed outside of the portion of the active display area viewed by the pilot through the collimator 412 to accommodate continuous imagery as the pilot moves or rotates his or her head. It should be noted that the focal length of the collimator 412 may be optimized for the particular size of the simulator, the size of the projection screen 108, to accommodate the operator's anticipated head movement and/or to provide an apparent virtual image location at or near infinity.

The image displayed on the projection screen 108 may be viewed by the pilot via the collimator 412, which in some embodiments, as described herein, is a spherical first surface collimating mirror. The projection screen 108 in some embodiments is arranged and positioned at a distance from the collimator 412 such that the image displayed, as seen by the pilot via the collimator 412, requires the eyes to slightly converge (or be parallel), allowing the pilot to perceive a far-focused or collimated virtual image. Thus, the image may be perceived to be at distance from the pilot that may be greater than the distance between the pilot and the projection screen 108.

In some embodiments, collimation of the displayed image by the collimator 412 may be produced by a physical mirror (such as a spherical first surface collimating mirror) and beamsplitter collimator. In the mirror and beamsplitter collimating optics, a projection screen 108 is positioned at half of the radius of curvature of the spherical collimating mirror. In this embodiment, the position of the display is optically folded out of view of the pilot by using a partially reflective, partially transmissive mirror (commonly referred to as a beamsplitter). In one embodiment, the projection screen 108 is spherical shaped, which results in a reduced or minimal amount of image distortion as the pilot's position is moved away from the central optical axis. Thus, the pilot within the cabin shell 110 may view an image on the collimating mirror (which may be embodied as the collimator 412) from inside the enclosure of the cabin shell 110.

Accordingly, the flight simulator system 100 may be provided for displaying visual (e.g., out-the-window) images. The flight simulator system 100 also is capable of generating bright forward field of views 204 without the use of high pressure discharge lamps as described herein. The positioning of the LED array 116 in combination with the visual projector 120 allows for permanent installation (fixedly secured) or easier temporary installation.

Figure 5:
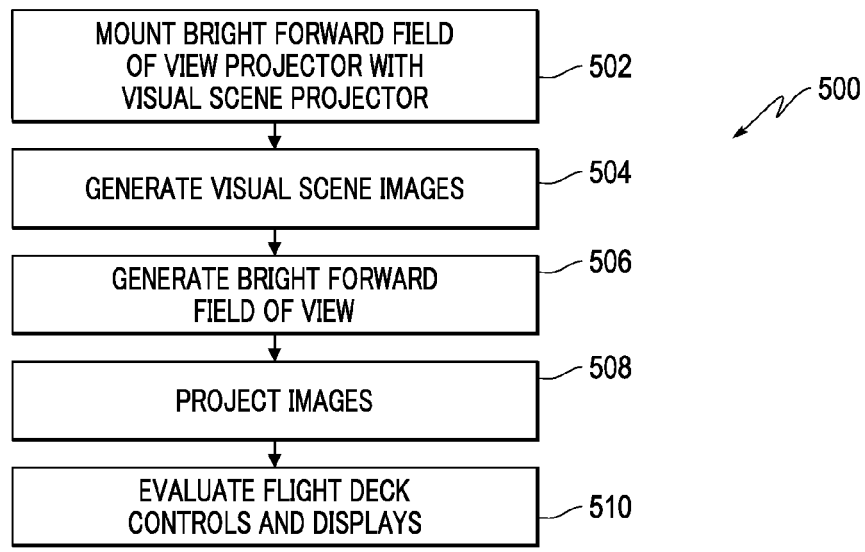
FIG. 5 is a block diagram of a method for generating images for a simulator in accordance with an embodiment.

A method 500 for generating simulation images (and for generating bright forward field of views) for a vehicle simulator also may be provided as shown in FIG. 5. The method 500 includes mounting a bright forward field of view projector in combination with a visual scene projector at 502. For example, as described herein, the LED array 116 may be mounted in combination (e.g., above) with the visual projector 120.

The method 500 further includes generating visual scene images at 504 and generating bright forward field of views at 506. For example, as described herein, a simulated sun image may be generated, such as simulated sunlight projected above the forward horizon and cloud deck image at 508. The method 500 includes evaluating flight deck controls and displays at 510, such as under different conditions by a pilot or engineer. For example, flight deck instrumentation illumination performance may be evaluated in an engineering flight simulator with a cross cockpit visual display system.

The various embodiments may be implemented in connection with different computing systems. Thus, while a particular computing or operating environment may be described herein, the computing or operating environment is intended to illustrate operations or processes that may be implemented, performed, and/or applied to a variety of different computing or operating environments.

The disclosure and drawing figure(s) describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, in some aspects of the disclosure, not all operations described herein need be performed.

Figure 6:
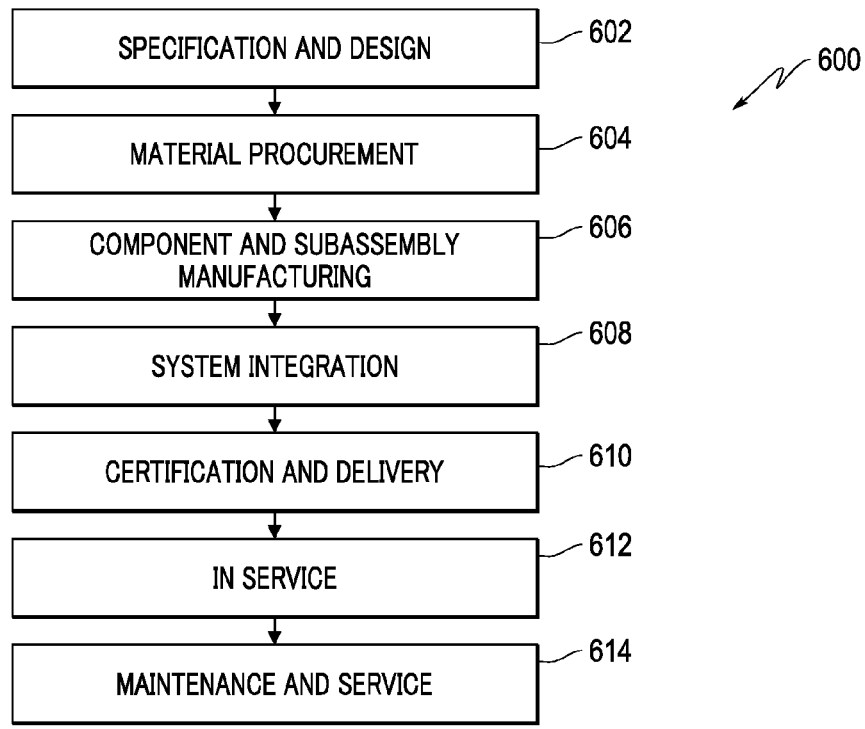
FIG. 6 is a block diagram of aircraft production and service methodology.
Figure 7:
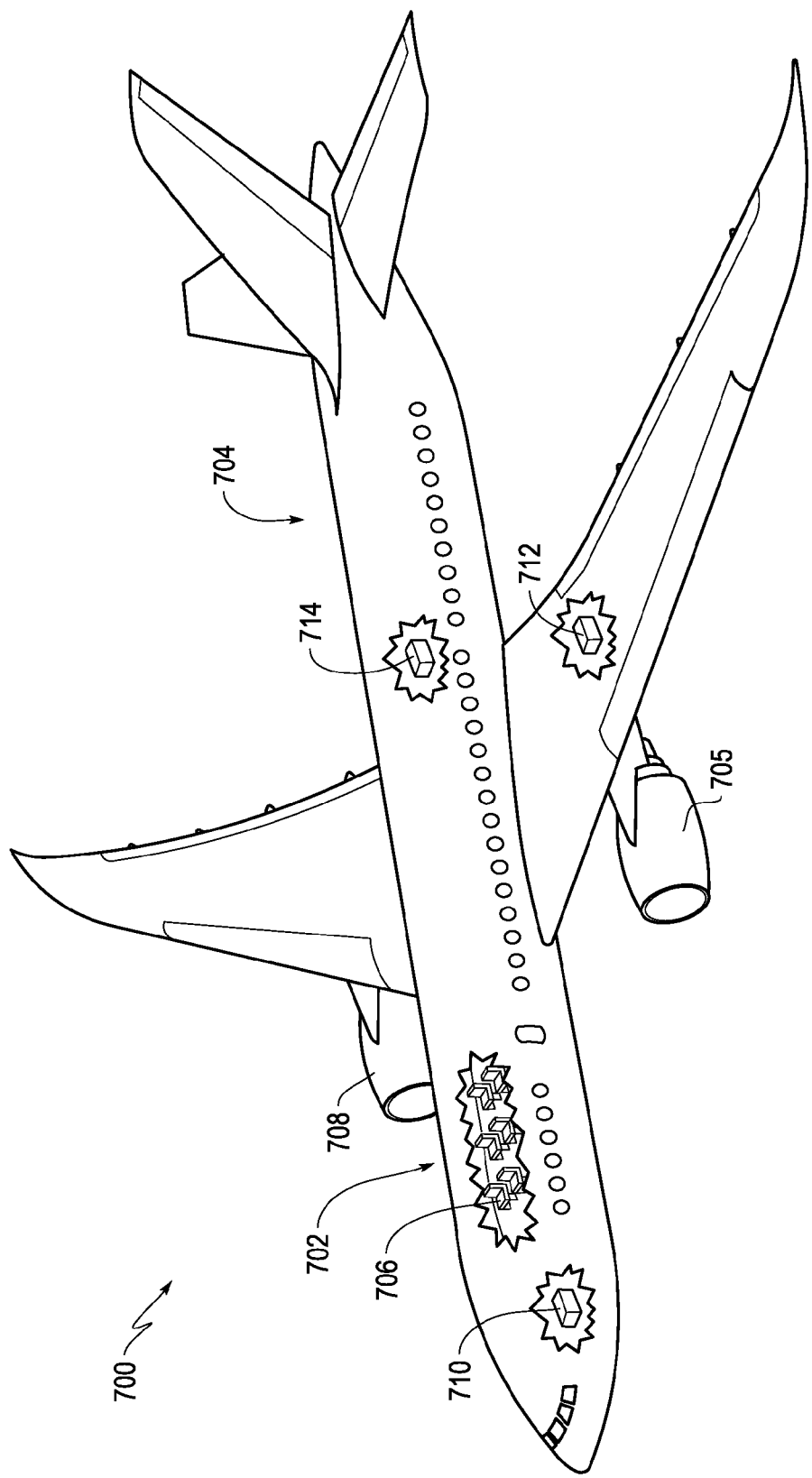
FIG. 7 is a schematic perspective view of an aircraft.

Examples of the disclosure may be described in the context of an aircraft manufacturing and service method 600 as shown in FIG. 6 and an aircraft 700 as shown in FIG. 7. During pre-production, illustrative method 600 may include specification and design 602 of the aircraft 700 and material procurement 604. During production, component and subassembly manufacturing 606 and system integration 608 of the aircraft 700 take place. Thereafter, the aircraft 700 may go through certification and delivery 610 to be placed in service 612. While in service by a customer, the aircraft 700 is scheduled for routine maintenance and service 614 (which may also include modification, reconfiguration, refurbishment, and so on).

Each of the processes of the illustrative method 600 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown FIG. 7, the aircraft 700 produced by the illustrative method 600 may include an airframe 702 with a plurality of high-level systems 704 and an interior 706. Examples of high-level systems 704 include one or more of a propulsion system 708, an electrical system 710, a hydraulic system 712, and an environmental system 714. Any number of other systems may be included. Although an aerospace example is shown, the principles may be applied to other industries, such as the automotive industry.

Apparatus and methods shown or described herein may be employed during any one or more of the stages of the manufacturing and service method 600. For example, components or subassemblies corresponding to component and subassembly manufacturing 606 may be fabricated or manufactured in a manner similar to components or subassemblies produced while the aircraft 700 is in service. Also, one or more aspects of the apparatus, method, or combination thereof may be utilized during the production states 606 and 608, for example, by substantially expediting assembly of or reducing the cost of an aircraft 700. Similarly, one or more aspects of the apparatus or method realizations, or a combination thereof, may be utilized, for example and without limitation, while the aircraft 700 is in service, e.g., maintenance and service 614.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

It should be noted that the various embodiments may be implemented in hardware, software or a combination thereof. The various embodiments and/or components, for example, the modules, or components and controllers therein, also may be implemented as part of one or more computers or processors or field-programmable gate arrays (FPGAs). The computer or processor or FPGA may include a computing device, an input device, a display unit and an interface, for example, for accessing the Internet. The computer or processor may include a microprocessor. The microprocessor may be connected to a communication bus. The computer or processor or FPGA may also include a memory. The memory may include Random Access Memory (RAM) and Read Only Memory (ROM). The computer or processor or FPGA further may include a storage device, which may be a hard disk drive or a removable storage drive such as an optical disk drive, and the like. The storage device may also be other similar means for loading computer programs or other instructions into the computer or processor.

As used herein, the terms "system," "subsystem," "circuit," "component," or "module" may include a hardware and/or software system that operates to perform one or more functions. For example, a module, circuit, component, or system may include a computer processor, controller, or other logic-based device that performs operations based on instructions stored on a tangible and non-transitory computer readable storage medium, such as a computer memory. Alternatively, a module, circuit, component, or system may include a hard-wired device that performs operations based on hard-wired logic of the device. The modules or circuits or components shown in the attached figures may represent the hardware that operates based on software or hardwired instructions, the software that directs hardware to perform the operations, or a combination thereof.

The block diagrams of embodiments herein illustrate various blocks labeled "circuit" or "module." It is to be understood that the circuits or modules may be implemented as hardware with associated instructions (e.g., software stored on a tangible and non-transitory computer readable storage medium, such as a computer hard drive, ROM, RAM, or the like) that perform the operations described herein. The hardware may include state machine circuitry hard wired to perform the functions described herein. Optionally, the hardware may include electronic circuits that include and/or are connected to one or more logic-based devices, such as microprocessors, processors, controllers, or the like. Optionally, the modules may represent processing circuitry such as one or more FPGAs, application specific integrated circuit (ASIC), or microprocessor. The circuit modules in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, the embodiments are by no means limiting and are exemplary embodiments. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, paragraph (f), unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A system comprising:
a display screen configured to display a projected image;
a first projector configured to project a visual image on the display screen; and
a second projector fixedly coupled to the first projector, the second projector including a plurality of light emitting diode light sources configured to project simulated ambient solar lighting on the display screen.

2. The system of claim 1, further comprising a back projection screen configured to generate the projected image based on the visual image, the simulated ambient solar lighting, or both.

3. The system of claim 1, wherein the plurality of light emitting diode light sources are arranged in a curved configuration.

4. The system of claim 3, wherein the curved configuration has a radius of curvature of 150 centimeters.

5. The system of claim 1, wherein each light emitting diode of the plurality of light emitting diode light sources has a maximum luminance contribution of 1,900 foot Lamberts.

6. The system of claim 1, wherein the the plurality of light emitting diode light sources have a total combined luminance of 10,000 foot Lamberts to 14,000 foot Lamberts.

7. The system of claim 1, further comprising a controller configured to control operation of the first projector and the second projector.

8. The system of claim 1, wherein the display screen includes a collimating mirror.

9. The system of claim 1, further comprising a cabin shell, wherein the display screen is viewable from within the cabin shell.

10. The system of claim 1, wherein the first projector is configured to project a cross-cockpit out-the-window image as the visual image, and wherein the simulated ambient solar lighting simulates the sun above a forward horizon and above a cloud deck.

11. A system comprising:
a cabin configured to receive therein a person, the cabin including at least one window; and
a visual display system including:
a display screen configured to display a projected image;
a first projector configured to project a visual image on the display screen; and
a second projector fixedly coupled to the first projector, the second projector including a plurality of light emitting diode light sources configured to project simulated ambient solar lighting on the display screen.

12. The system of claim 11, wherein the visual display system is configured to project the simulated ambient solar lighting without using high pressure discharge lamps.

13. The system of claim 11, wherein the cabin is a portion of an aircraft cockpit shell.

14. The system of claim 11, wherein the visual image includes an out-the-window image.

15. The system of claim 14, further comprising a back projection screen configured to generate the projected image based on the out-the-window image, the simulated ambient solar lighting, or both, wherein the display screen includes a collimating mirror configured to display the projected image towards the cabin.

16. A method comprising:
projecting a visual image from a first projector;
displaying the visual image at a display screen;
projecting simulated ambient solar lighting from a second projector fixedly coupled to the first projector, wherein the simulated ambient solar lighting is generated by a plurality of light emitting diode light sources of the second projector; and
displaying the simulated ambient solar lighting at the display screen.

17. The method of claim 16, further comprising positioning the first projector and the second projector such that the visual image and the simulated ambient solar lighting are displayed at the display screen relative to an expected pilot's eye point.

18. The method of claim 16, further comprising:
projecting the visual image from a back projection screen to the display screen, wherein the first projector projects the visual image to the back projection screen; and
projecting the simulated ambient solar lighting from the back projection screen to the display screen, wherein the second projector projects the simulated ambient solar lighting to the back projection screen.

19. The method of claim 16, wherein the simulated ambient solar lighting is projected without using high pressure discharge lamps.

20. The method of claim 16, wherein the simulated ambient solar lighting is projected using only the plurality of light emitting diode light sources.

* * * * *